United States Patent
Parandehgheibi et al.

(10) Patent No.: US 12,432,248 B2
(45) Date of Patent: Sep. 30, 2025

(54) NETWORK TAILORED VULNERABILITY IMPACT ASSESSMENT

(71) Applicant: Palo Alto Networks, Inc., Santa Clara, CA (US)

(72) Inventors: Ali Parandehgheibi, Menlo Park, CA (US); Gaurav Sharma, Mountain View, CA (US); Alina Asish Rath, San Francisco, CA (US); Christopher Nicholas Ganas, Glen Allen, CA (US); Anupam Bharali, San Jose, CA (US); Suresh Venkataraman, Tracy, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 293 days.

(21) Appl. No.: 18/338,262

(22) Filed: Jun. 20, 2023

(65) Prior Publication Data
US 2024/0430288 A1 Dec. 26, 2024

(51) Int. Cl.
*H04L 9/40* (2022.01)
*G06F 21/57* (2013.01)

(52) U.S. Cl.
CPC ........ *H04L 63/1433* (2013.01); *G06F 21/577* (2013.01); *H04L 63/1425* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 10,410,158 B1* | 9/2019 | Yumer | ............... | G06N 20/00 |
| 11,637,855 B2* | 4/2023 | Shua | ............... | G06F 9/45558 |
| | | | | 726/25 |
| 11,803,646 B2* | 10/2023 | Shivanna | ............... | G06F 21/577 |
| 12,142,292 B2* | 11/2024 | Hawker | ............... | H04B 11/00 |
| 12,235,968 B2* | 2/2025 | Wurster | ............... | G06F 21/577 |
| 12,265,631 B1* | 4/2025 | Singh | ............... | G06F 21/577 |
| 2016/0173521 A1* | 6/2016 | Yampolskiy | ............ | G06F 21/56 |
| | | | | 726/25 |

* cited by examiner

*Primary Examiner* — Lashonda Jacobs-Burton
(74) *Attorney, Agent, or Firm* — Gilliam IP PLLC

(57) ABSTRACT

A system as disclosed herein analyzes unresolved vulnerabilities against current configurations of devices of a network to generate an impact analysis report which provides a comprehensive view of the impact of the vulnerabilities on the network. This provides a manageable perspective of risk assessment and remediation for the network. To maintain a current view of device configurations, telemetry data streams are collected from the devices. A listing of outstanding or unresolved cybersecurity vulnerabilities is also maintained. When an analysis trigger is detected, the system extracts values of configuration properties for devices from the telemetry data streams and analyses them against the list of vulnerabilities to determine devices affected by the vulnerabilities. Tracking data are maintained according to the determinations of affected devices across vulnerabilities. This data is aggregated into an impact report that indicates impact of vulnerabilities to the network.

20 Claims, 6 Drawing Sheets

NETWORK TAILORED VULNERABILITY IMPACT ASSESSMENT

BACKGROUND

The disclosure generally relates to network architectures or network communication protocols for network security (e.g., H04L 63/00) and electrical digital data processing (e.g., G06F 2207).

The CVE® program is an international, community-driven effort to catalog vulnerabilities in accordance with established guidelines and rules. The community includes government organizations, corporations, industry trade groups, and an open intelligence community. The United States government provides the National Vulnerabilities Database (NVD) through the National Institute of Standards and Technology (NIST). The U.S. Department of Homeland Security (DHS) Cybersecurity and Infrastructure Security Agency (CISA) sponsors the CVE program.

The glossary of the CVE program defines a vulnerability as "A flaw in a software, firmware, hardware, or service component resulting from a weakness that can be exploited, causing a negative impact to the confidentiality, integrity, or availability of an impacted component or components." When a vulnerability is discovered, it is reported to a CVE program participant. The participant requests a CVE identifier (CVE ID) from a CVE Numbering Authority (CNA) which reserves a CVE record. Details about the vulnerability are collected and submitted for evaluation. If the submitted details satisfy the minimum required information, the CVE record is published to the CVE list.

BRIEF DESCRIPTION OF THE DRAWINGS

Embodiments of the disclosure may be better understood by referencing the accompanying drawings.

FIG. 4 is an example flowchart of example operations for assessing impact of cybersecurity vulnerabilities on a network from a global perspective with respect to streaming device configurations while

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Overview

Discovered software vulnerabilities have been growing substantially to the point of currently yielding several hundred vulnerability publications per week. Adding to the volume of disclosed vulnerabilities, the dynamic nature of both membership of devices in a network and configurations of those devices results in an unmanageable risk assessment task for cybersecurity/network administrators.

A system as disclosed herein analyzes unresolved vulnerabilities against current state of a network to generate an impact analysis report which provides a comprehensive view of the impact of the vulnerabilities on the network. This provides a manageable perspective of risk assessment and remediation for the network. The "current state" of the network is with respect to current configurations of devices of the network. To maintain a current view of device configurations, telemetry data streams are collected from the devices. A listing of outstanding or unresolved cybersecurity vulnerabilities is also maintained. When an analysis trigger is detected (e.g., temporal trigger or event trigger), the system extracts values of configuration properties for devices from the telemetry data streams and analyses them against the list of vulnerabilities to determine devices affected by the vulnerabilities. This occurs for device configurations that have been generated from the telemetry data streams of reporting devices in the network. Tracking data (e.g., statistical data) are maintained according to the determinations of affected devices across vulnerabilities. This data is aggregated into an impact report that indicates impact of vulnerabilities to the network (e.g., percentage of devices affected).

Example Illustrations

Figure 1:
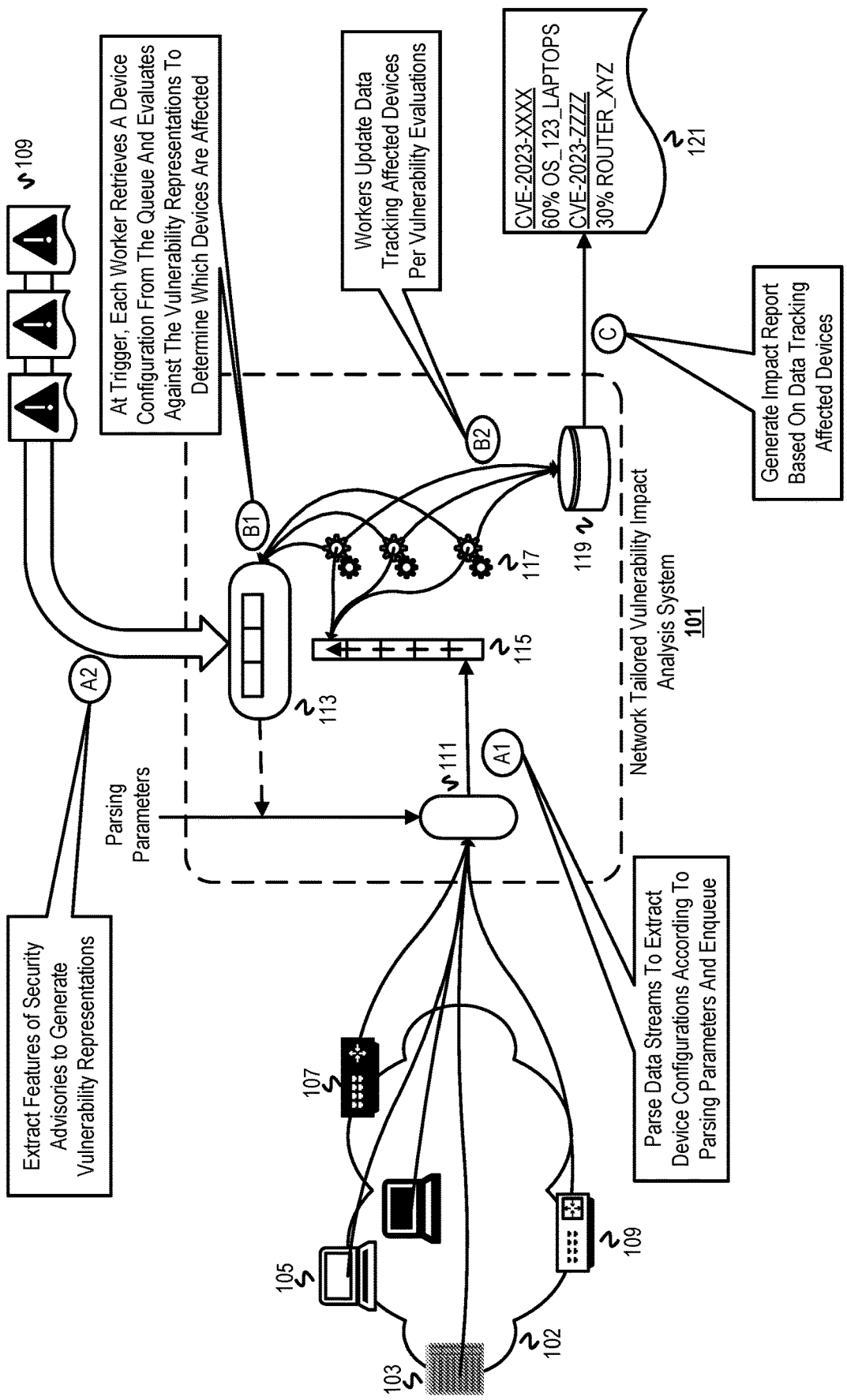
FIG. 1 is a diagram of a network tailored vulnerability impact system.

FIG. 1 is a diagram of a network tailored vulnerability impact system. A network tailored vulnerability impact system 101 determines current device configurations of devices of a network 102 and determines impact on the network 102 of unresolved vulnerabilities based the current device configurations and vulnerability descriptions of security advisories 109. FIG. 1 depicts the network tailored vulnerability impact system 101 as distinct from the network 102 but can be hosted in the network 102. The tailored network vulnerability impact system 102 includes a parser 111, a queue 115, a store 113, and a repository 119.

FIG. 1 depicts a variety of devices of the network 102, examples of which include network devices, laptop computers, and servers. Configurations of devices, even devices of a same type, can vary by enabled software features, operating system, software versions, etc. Moreover, a device is a configuration item and components of the device are configuration items. As examples, a network card installed on a device is a configuration item, the operating system is a configuration item, and each installed application is a configuration item. Each of the devices depicted in the network 102 communicates telemetry data streams to the network tailored vulnerability impact system 101 ("impact system"). Each telemetry data stream conveys current configuration of the reporting device, which includes configuration of each configuration item monitored on the device. With the telemetry data streams, the impact system 101 continuously collects current configuration information of devices across the network 102.

FIG. 1 is annotated with a series of letters A1, A2, B1, B2, C, each of which represents one or more operations. Although these stages are ordered for this example, the stages illustrate one example to aid in understanding this disclosure and should not be used to limit the claims. Subject matter falling within the scope of the claims can vary from what is illustrated.

Stages A1 and A2 correspond to ongoing operations for collection of telemetry data and disclosed vulnerabilities by security advisories or alerts. The stages are asynchronous. At stage A1, the parser 111 parses the telemetry data streams according to parsing parameters to extract current device configurations. The parsing parameters indicate which configuration parameters to extract from telemetry data streams to determine whether a device is affected by a vulnerability. At stage A2, the impact system 101 extracts features of security advisories 109 to generate vulnerability representations. The impact system 101 maintains a listing of the vulnerability representations in the store 113. The features are items of information from a vulnerability description in the security advisory to form a representation of the vulnerability that can be used to evaluate device configurations to determine whether a device is affected.

Stages B1 and B2 overlap since workers of the impact system are running concurrently. The system may instantiate the workers upon detection of a trigger or unquiesce workers, assuming they have been quiesced. At stage B1, the impact system 102 uses workers (e.g., processes or threads) to evaluate device configurations against vulnerability representations upon detection of a trigger. After the trigger is detected, each worker dequeues a device configuration from the queue 115, evaluates the device configuration against the vulnerability representations in the store 113, and determines which devices in the network 102 are affected. At stage B2, the workers update tracking data based on determinations of affected devices per vulnerability. The workers update the tracking data in the repository 119.

At stage C, the impact system generates an impact report 121 based on the data tracking affected devices. The impact report 121 indicates impact of the unresolved vulnerabilities on the network for the devices as configured during a reporting period. The reporting period is the time encompassed by the device configurations beginning with the trigger detection. Based on the data tracking affected devices per vulnerability, the impact report 121 indicates that a vulnerability identified as CVE-2023-XXXX affects 60% of the OS_123_LAPTOPS devices and a vulnerability identified as CVE-2023-ZZZZ affects 30% of the ROUTER_XYZ routers. With this information, a security operations center of an enterprise corresponding to the network 102 can prioritize remediation. The limited example of two categories of devices affected by two vulnerabilities does not reflect actual magnitude of impact of vulnerabilities that can number in hundreds per week on a network with thousands of devices.

Figure 2:
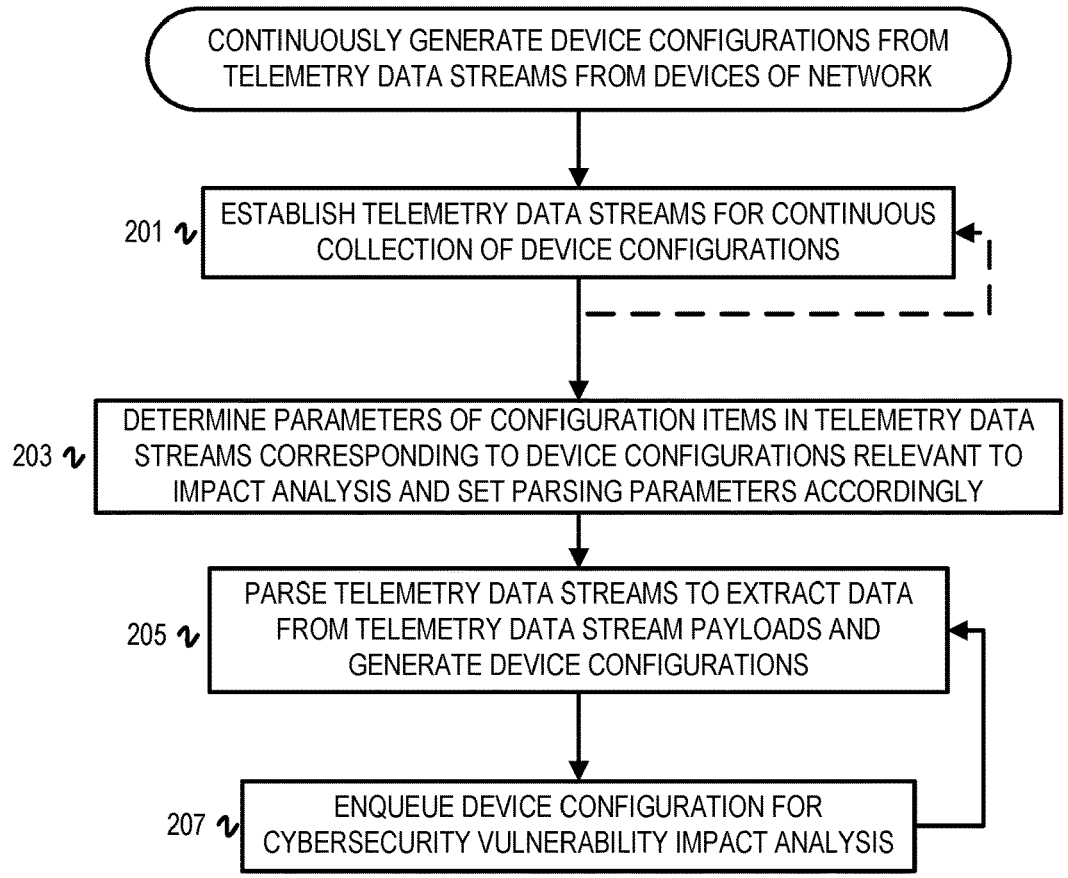
FIG. 2 is a flowchart of example operations for continuously generating device configurations from telemetry data streams from devices of a network.
Figure 3:
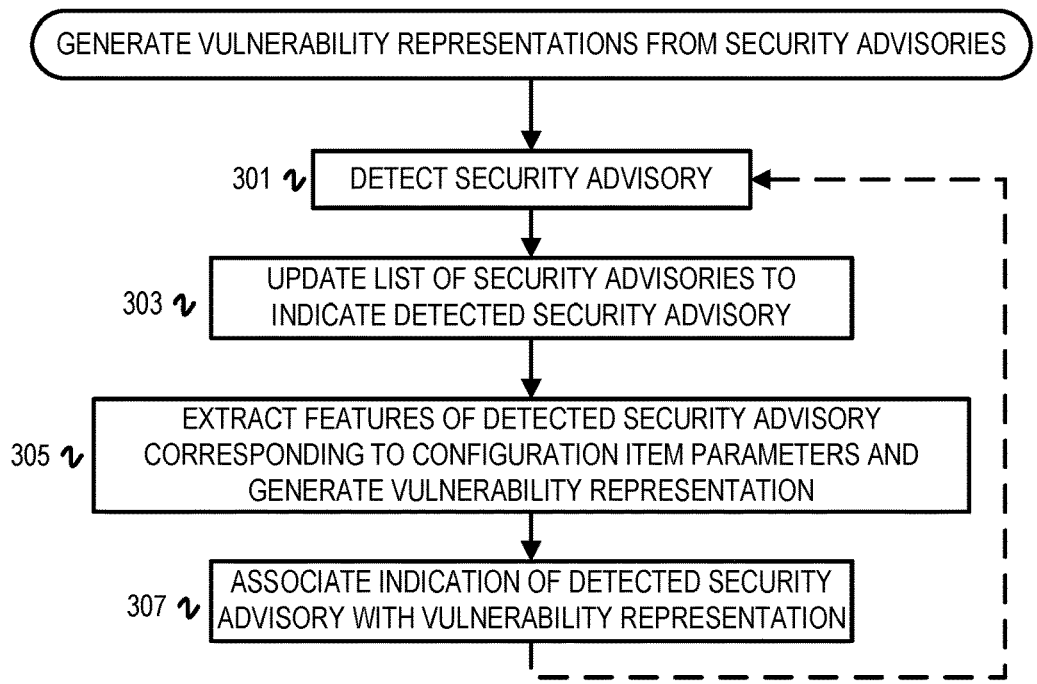
FIG. 3 is a flowchart of example operations for generating vulnerability representations from security advisories.
Figure 4:
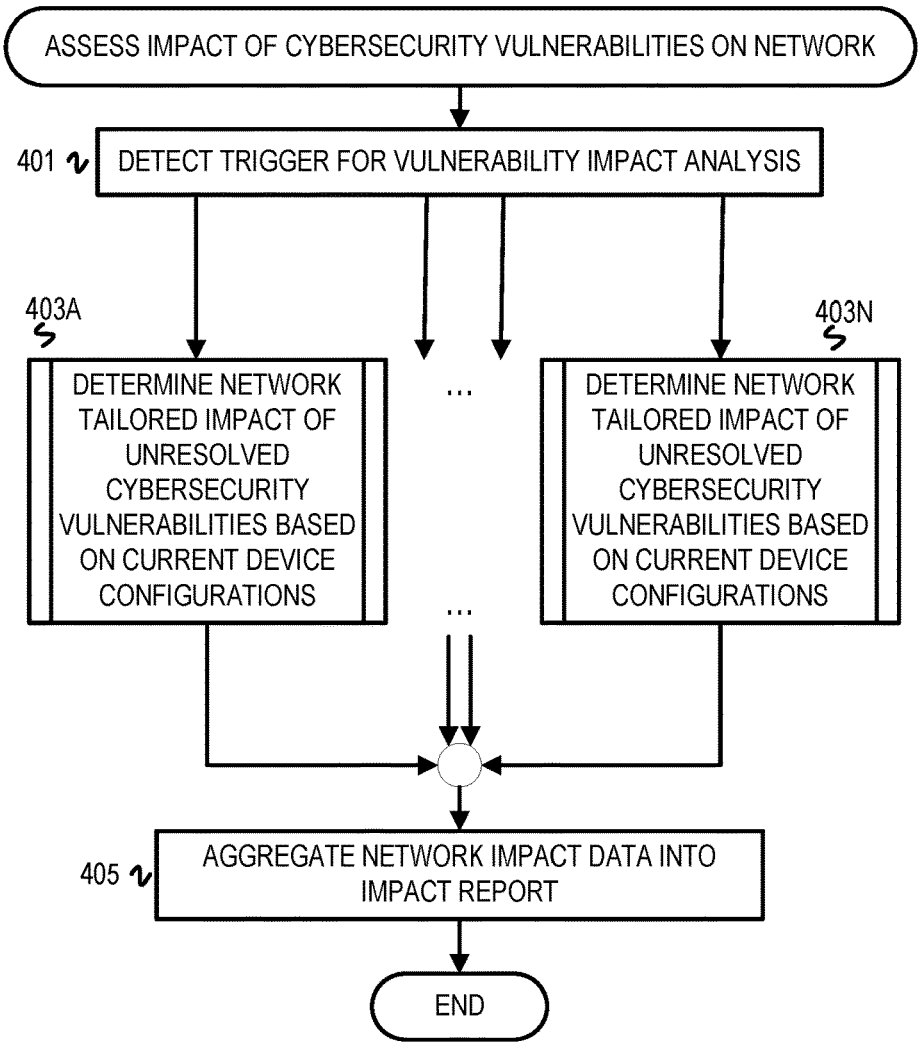
Figure 5:
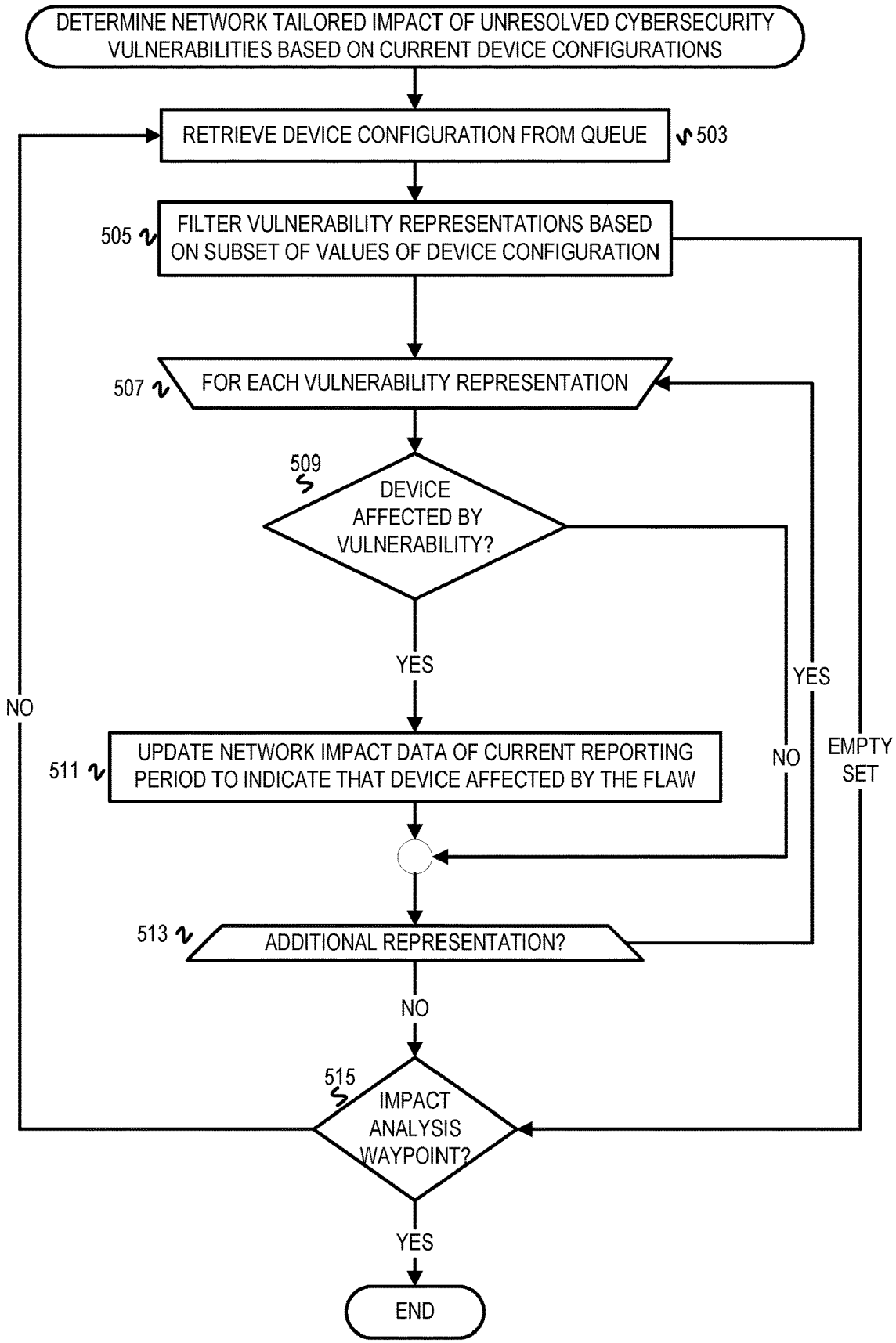
FIG. 5 is a flowchart of example operations from the perspective assessing each device configuration.

Although FIG. 1 presents an architecture with workers concurrently operating on a queue of device configurations, the diagram is an example illustration and embodiments are not so limited. Different publisher-subscriber models or parallel processing paradigms can be used. The following flowcharts present example operations that are not bound to the implementation illustrated in FIG. 1. FIGS. 2-5 are flowcharts for the different aspects of maintaining a current awareness of device configurations and unresolved vulnerabilities and determining tailored impact of the unresolved vulnerabilities on a network. FIGS. 2-3 are flowcharts relating to the data collection aspects and FIGS. 4-5 are flowcharts relating to the evaluation and reporting aspects. Descriptions of the flowcharts refer to the impact system as performing the operations for consistency with FIG. 1.

FIG. 2 is a flowchart of example operations for continuously generating device configurations from telemetry data streams from devices of a network. The continuous collection of device configurations leverages telemetry agents running on devices.

At block 201, the impact system establishes telemetry data streams for continuous collection of device configurations. Telemetry agents on the devices can be configured to communicate the data streams at a specified cadence with configuration information to a destination accessible by the impact system. In addition to cadence-based telemetry, the telemetry agents can be configured to push information when a configuration change is detected. The impact system can subscribe to the telemetry data streams. A device identifier can be determined and bound to a data stream when established, which allows the impact system to maintain an association between the device configurations and device identifier per data stream. Payloads of a data stream will have a defined structure (e.g., schema or layout and constituent parameters). Structure may vary by type of device generating the data stream and/or telemetry agent. For example, payloads in a telemetry data stream from a firewall may have a different structure than payloads of a telemetry data stream from a laptop computer. The structure delineates configuration items and configuration parameters per configuration item. Since data stream delivery is ongoing, a data stream will indicate current configuration of the one or more configuration items of the reporting device. A dashed line from block 201 to itself indicates non-deterministic recurring of the operation represented by block 201.

At block 203, the impact system determines parameters of configuration items in the telemetry data streams corresponding to device configurations relevant to impact analysis and sets parsing parameters accordingly. Configuration items and configuration parameters relevant to impact analysis will be specified, for example in a file or in settings of the impact system. These can be static or variable. A telemetry data stream may communicate device configurations in payloads that structure configuration items in a hierarchy, with the reporting device as the root configuration item. Any root configuration item can be specified as relevant to impact analysis. The configuration parameters specified for a root configuration item may be operating system (OS), OS version (assuming OS and OS version are distinct parameters), firmware version, and manufacturer identifier. An example of a specified static configuration item relevant to impact analysis may be a particular application. The configuration items and corresponding configuration parameters specified as relevant to impact analysis are mapped to the corresponding information in the telemetry data stream to set parsing parameters for extraction of values assigned to the configuration items and configuration parameters conveyed in the telemetry data streams. For instance, parsing parameters would be set to locate a root configuration item and keys or tags in a payload of a telemetry data stream and the corresponding values assigned thereto. If there are telemetry data streams of different structures, then parsing parameters would be set according to the varying structures.

At block 205, the impact system parses telemetry data streams to extract data from the telemetry data streams payloads and generates device configurations. The data streams having common structure could be merged into a single data stream that is parsed. The impact system can have parsers running in parallel to process the telemetry data streams. Parsing a telemetry data stream can be considered extracting the payload from a protocol data unit (e.g., datagram, packet, or message) and then parsing the payload according to the parsing parameters. The impact system parses a payload to extract (e.g., read and record) the values assigned to the configuration parameters of each configuration item in the payload and generates a device configuration therefrom. The arrangement of data to generate the device configuration is determined in advance to allow for evaluation against vulnerability representations.

At block 207, the impact system enqueues the generated device configuration for cybersecurity vulnerability impact analysis. This effectively creates a data stream of device configurations derived from the telemetry data streams. Operational flow returns to block 205. As the telemetry data streams are ongoing, the device configuration generation is also ongoing.

FIG. 3 is a flowchart of example operations for generating vulnerability representations from security advisories. Similar to the telemetry data streams, disclosure of vulnerabilities is ongoing. As vulnerabilities are disclosed, the impact system generates representations therefrom to facilitate up-to-date impact analysis. At block 301, the impact system detects a security advisory. The impact system can be subscribed to alerts/security advisories that disclose cybersecurity vulnerabilities. At block 303, the impact system updates a list of security advisories to indicate the detected security advisory. The impact system maintains the list to track unresolved or outstanding vulnerabilities. At block 305, the impact system extracts features of the detected security advisory corresponding to the configuration parameters of the configuration item indicated in the security advisory and generates a representation of the vulnerability disclosed in the security advisory. A security advisory will include a vulnerability description that identifies an affected device. The structure of the security advisory is established, typically conforming to a standard defined by an organization. Thus, the impact system will locate keywords in the security advisory that describe an affected device. The description of the affected device often includes configuration parameters (e.g., platform, version, etc.). In some cases, a vulnerability may affect any device with operating system ABC. However, a vulnerability may also affect only devices of manufacturer XYZ with application 123 versions less than version 2.05. The impact system will extract this information to generate the vulnerability representation. At block 307, the impact system associates the indication of the security advisory in the list of security advisories with the vulnerability representation. Maintaining the association between the vulnerability representation and the security advisory allows efficient updates of vulnerability representations based on subsequent security advisories and preserves the information for possible inclusion in reports and/or analysis. Operational flow asynchronously returns to block 301.

FIG. 4 is a flowchart of example operations for assessing impact of cybersecurity vulnerabilities on a network from a global perspective with respect to streaming device configurations while FIG. 5 is a flowchart of example operations from the perspective assessing each device configuration. The example operations do not specify instantiating the threads or processes that will perform the work of evaluating device configurations since implementations will vary. The example operations presume workers are available to perform the evaluation task.

At block 401, the impact system detects a trigger for vulnerability impact analysis. For example, vulnerability impact analysis may be scheduled to occur daily at a specified time. In addition or instead of a periodic impact analysis, the impact analysis trigger can be event driven. An event may be fulfillment of a condition, such as increase in network membership beyond a threshold or detection of a security advisory classified as high severity.

Upon detection of the vulnerability impact analysis trigger, the impact system determines network tailored impact of unresolved cybersecurity vulnerabilities based on current device configurations at blocks 403A-403N. The impact system uses Nworkers to asynchronously process the stream of device configurations and determine affected devices in parallel.

FIG. 5 is a flowchart of example operations for determining network tailored impact of unresolved cybersecurity vulnerabilities based on current device configurations. The example operations are performed by a single worker. The example operations will be described with reference to a worker spawned or run by the impact system.

At block 503, a worker retrieves a device configuration from a queue of device configurations. Implementations may limit the memory that can be consumed by the queue of device configurations. A process or thread managing the queue can be programmed to discard expired device configurations according to a defined time-to-live for device configurations. Assuming an implementation with a size limited queue, device configurations can be popped from the front to allow for pushing of newly arriving device configurations. Since device configuration generation is ongoing, information is not lost. However, an implementation can use a spillover queue. When spillover is detected from a primary queue to a temporary queue, the spillover can be handled as an event that triggers impact analysis.

At block 505, the worker filters the vulnerability representations based on a subset of values of device configurations. For instance, a vulnerability representation may indicate a device type, an operating system version, and enabled software features. The worker does a first pass evaluation based on device type indicated in the device configuration to filter out those of the vulnerabilities that are not relevant. If the device configuration is for a device not of the device type affected by the vulnerability, then the worker can forego evaluating the other configuration parameters, such as enabled software features. If all representations are filtered out (i.e., the empty set remains), then operational flow proceeds to block 515. Otherwise, operational flow proceeds to block 507.

At block 507, the worker begins iteratively processing the filtered vulnerability representations. The iterative process includes the operations represented by blocks 509, 511.

At block 509, the worker determines whether the device corresponding to the device configuration is affected by the vulnerability corresponding to the vulnerability representation. The worker evaluates the retrieved device configuration against the vulnerability representation. Implementations can use various token or keyword matching techniques to determine whether the device is affected. Embodiments may normalize the device configurations and vulnerability representations to allow for hash-based comparisons to determine whether a device is affected. If the device corresponding to the device configuration is affected, then operational flow proceeds to block 511. Otherwise, operational flow proceeds to block 513.

At block 511, the worker updates network impact data of a current reporting period to indicate that the device is affected by the vulnerability. The worker updates a count of devices affected by the vulnerability. The count is initialized for each reporting period. Implementations can vary regarding maintaining a history of reporting periods for trend analysis. Implementations can also maintain counts by device type to allow for different levels of detail to be presented in an impact analysis report. For instance, an initial statistic of affected devices by vulnerability across device types can be presented and interaction with the report presented via a graphical user interface can allow for the general statistics to expand into more detail.

At block 513, the worker determines whether there is an additional vulnerability representation to process. The worker may traverse the list of vulnerability representations that is read accessible by all workers or maintain its own copy of the list of vulnerability representations. If there is another representation to process, operational flow returns to block 507. If there is not another representation to process, then operational flow proceeds to block 515.

At block 515, the worker determines whether the worker has reached an impact analysis waypoint. The waypoint indicates when determination of affected devices ends. As an example, the waypoint may be when device configurations for all devices in the network that supply telemetry data streams have been evaluated. With the device identifiers associated with streams, the device identifiers can be propagated to the device configurations. An array with n elements representing n devices can be maintained. When a worker processes a device configuration, the worker can set the location in the array corresponding to the device of the device configuration. When all entries have been set to 1 (or 0 depending on implementation), the waypoint has been reached. The impact analysis waypoint can be defined by time, number of device configurations evaluated, etc. The impact analysis waypoint can be defined by multiple conditions. For example, the impact analysis waypoint can be defined as a threshold number of device configurations processed limited by a fraction of the reporting period. If the waypoint has not been reached, then operational flow returns to block 503 for the worker to retrieve the device configuration at the front of the queue. If the waypoint has been reached, then operational flow of FIG. 5 ends and proceeds to block 405 of FIG. 4.

Returning to FIG. 4, the impact system aggregates the network impact data into an impact report at block 405. The workers will converge based on a chosen parallel processing implementation as informed by the impact analysis waypoint and aggregate the impact data that has been created by the workers. For each vulnerability, the workers will have tracked devices affected. This can be counts of affected devices per vulnerability, ratio of affected devices to total devices of a same type, etc. If each worker maintained separate impact data, the impact system would aggregate the separately created and updated tracking data.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in block 505 may not be performed. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
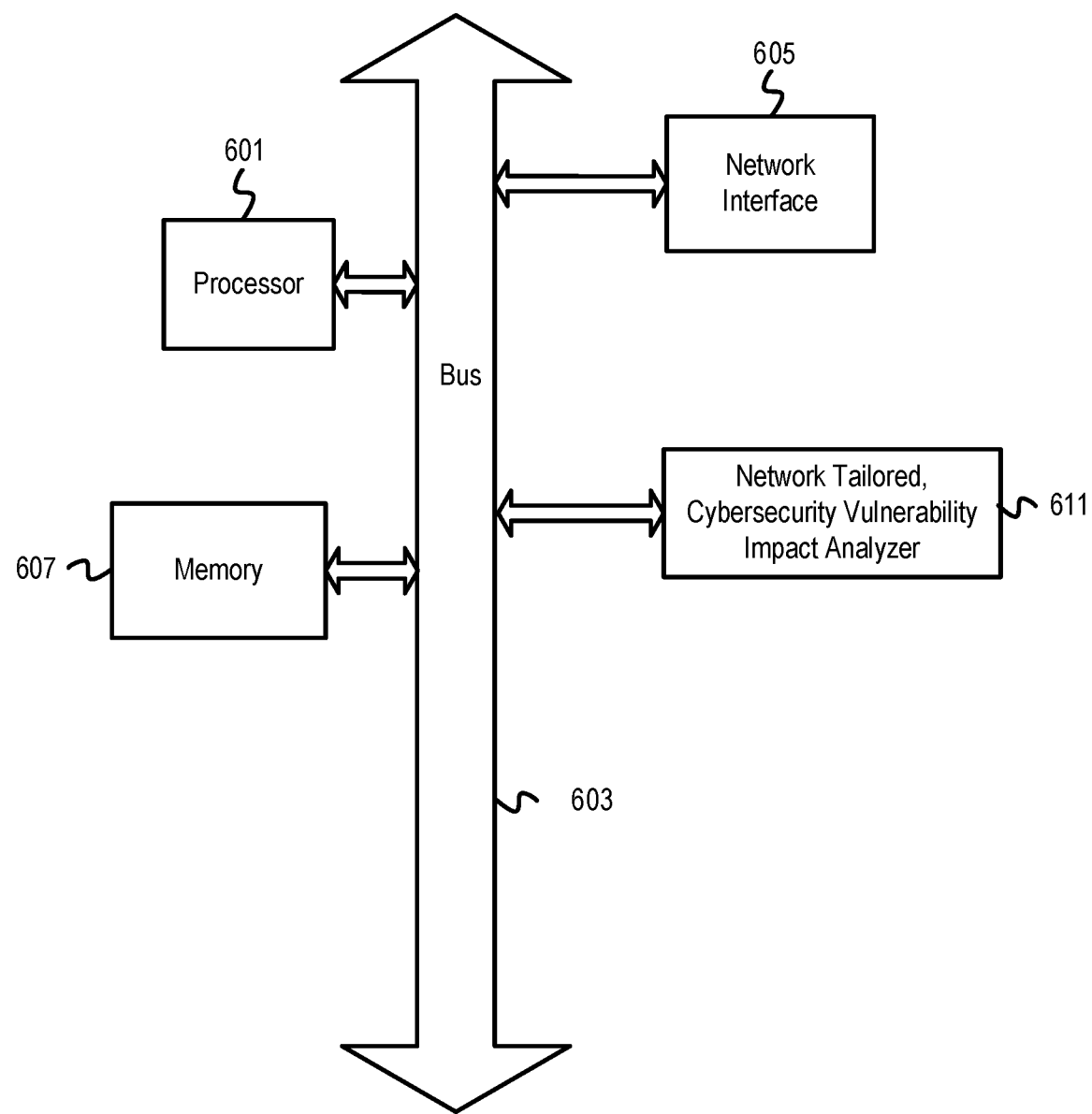
FIG. 6 depicts an example computer system with a cybersecurity vulnerability impact analyzer.

FIG. 6 depicts an example computer system with a cybersecurity vulnerability impact analyzer. The computer system includes a processor 601 (possibly including multiple processors, multiple cores, multiple nodes, and/or implementing multi-threading, etc.). The computer system includes memory 607. The memory 607 may be system memory or any one or more of the above already described possible realizations of machine-readable media. The computer system also includes a bus 603 and a network interface 605. The system also includes cybersecurity vulnerability impact analyzer 611 that tailors the analysis to current configurations of a network. The cybersecurity vulnerability impact analyzer 611 tailors the analysis by maintaining current information on configurations of devices in the network as reported by the devices with telemetry data streams. The cybersecurity vulnerability impact analyzer 611 also maintains a current listing of unresolved vulnerabilities or security advisories/alerts that indicate the unresolved vulnerabilities. The cybersecurity vulnerability impact analyzer 611 continuously derives device configurations from the data streams and evaluates the device configurations to determine devices affected by the unresolved vulnerabilities. Data is maintained based on the evaluations that indicates devices affected by each vulnerability. The cybersecurity vulnerability impact analyzer 611 aggregates the data into an impact report that expresses the extent of impact of each vulnerability on the network based on the current device configurations. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
    determining impact on a network of cybersecurity vulnerabilities currently unresolved for the network based on current state of the network with respect to configurations of devices of the network, wherein determining impact on the network comprises,
        determining device configurations from telemetry data streams from a plurality of devices in the network, wherein determining the device configurations and receipt of the telemetry data streams is ongoing;
        for each device configuration, determining which of the cybersecurity vulnerabilities affect the device of the plurality of devices corresponding to the device configuration; and
        for those of the cybersecurity vulnerabilities determined to affect at least one of the plurality of devices, maintaining tracking data based on determinations of affected devices; and
    in response to a trigger, generating a report with the tracking data which indicates current impact of the cybersecurity vulnerabilities on the network.

2. The method of claim 1, wherein determining the device configurations from the ongoing telemetry data streams comprises parsing each of the ongoing telemetry data streams according to specified device configuration parameters and extracting values of the device configuration parameters for the device corresponding to the telemetry data stream being parsed.

3. The method of claim 2 further comprising forming a data stream of device configurations with the extracted values, wherein determining, for each device configuration, which of the cybersecurity vulnerabilities affect the device of the plurality of devices corresponding to the device configuration comprises reading the device configuration from the data stream of device configurations.

4. The method of claim 1, wherein determining, for each device configuration, which of the cybersecurity vulnerabilities affect the device of the plurality of devices corresponding to the device configuration comprises filtering the cybersecurity vulnerabilities based on a first subset of values that form the device configuration and then determining whether any of the filtered cybersecurity vulnerabilities affect the device based on descriptions of the filtered cybersecurity vulnerabilities and a second subset of the values that form the device configuration.

5. The method of claim 1, wherein maintaining tracking data for those of the cybersecurity vulnerabilities determined to affect at least one of the plurality of devices comprises tracking number of devices affected within a current time period for each cybersecurity vulnerability affecting a device in the network.

6. The method of claim 1, wherein the current time period is defined by triggers and wherein a trigger is expiration of a time period, occurrence of a time, or a specified event.

7. The method of claim 1 further comprising obtaining a listing of the cybersecurity vulnerabilities, wherein determining which of the cybersecurity vulnerabilities affect which of the plurality of devices based on the device configurations comprises evaluating vulnerabilities descriptions of the cybersecurity vulnerabilities identified in the listing against the device configurations and wherein the listing of the cybersecurity vulnerabilities is updated according to cybersecurity advisories and alerts.

8. The method of claim 1, wherein the cybersecurity vulnerabilities are indicated in an active listing of cybersecurity vulnerabilities updated according to published security advisories and alerts.

9. A non-transitory, machine-readable medium having program code stored thereon, the program code comprising instructions to:
    based on detection of a trigger, asynchronously analyze each of a plurality of device configurations streamed from a plurality of devices of a network in parallel to determine, for each of a plurality of cybersecurity vulnerabilities, which of the plurality of devices are affected;
    for each of a recurring current time period,
        maintain tracking data for each of the plurality cybersecurity vulnerabilities according to determinations of which devices are affected by each of the plurality of cybersecurity vulnerabilities for the current time period; and
        aggregate the tracking data across the asynchronous, parallel analysis to generate a report indicating current impact of the plurality of cybersecurity vulnerabilities on the network.

10. The machine-readable medium of claim 9, wherein the instructions to analyze each of the plurality of device configurations comprise instructions to evaluate each of the plurality of device configurations against representations of the plurality of cybersecurity vulnerabilities.

11. The machine-readable medium of claim 10, wherein the program code further comprises instructions to:
    update the plurality of cybersecurity vulnerabilities to indicate newly disclosed or published cybersecurity vulnerabilities;
    generate a representation of each of the plurality of cybersecurity vulnerabilities after detection of the cybersecurity vulnerability; and maintain a listing of the representations of those of the plurality of cybersecurity vulnerabilities that remain unresolved for the network.

12. The machine-readable medium of claim 9, wherein the program code further comprises instructions to continuously update the plurality of device configurations with device configurations generated from telemetry data streams communicated from the plurality of devices, wherein the instructions to continuously update the plurality of device configurations comprise instructions to, for each of the telemetry data streams, parse the telemetry data stream for configuration items and configuration parameters of each configuration item and extract values assigned to the configuration parameters, wherein the configuration parameters have been previously specified.

13. An apparatus comprising:
a processor; and
a machine-readable medium having instructions stored thereon that are executable by the processor to cause the apparatus to,
determine impact on a network of cybersecurity vulnerabilities currently unresolved for the network based on current state of the network with respect to configurations of devices of the network, wherein the instructions to determine impact on the network comprise instructions to,
determine device configurations from telemetry data streams from a plurality of devices in the network, wherein determining the device configurations and receipt of the telemetry data streams is ongoing;
for each device configuration, determine which of the cybersecurity vulnerabilities affect the device of the plurality of devices corresponding to the device configuration; and
for those of the cybersecurity vulnerabilities determined to affect at least one of the plurality of devices, maintain tracking data based on determinations of affected devices; and
in response to a trigger, generate a report with the tracking data which indicates current impact of the cybersecurity vulnerabilities on the network.

14. The apparatus of claim 13, wherein the instructions to determine the device configurations from the ongoing telemetry data streams comprise instructions to parse each of the ongoing telemetry data streams according to specified device configuration parameters and extract values of the device configuration parameters for the device corresponding to the telemetry data stream being parsed.

15. The apparatus of claim 14, wherein the machine-readable medium further comprises instructions executable by the processor to cause the apparatus to form a data stream of device configurations with the extracted values, wherein the instructions to determine, for each device configuration, which of the cybersecurity vulnerabilities affect the device of the plurality of devices corresponding to the device configuration comprise instructions to read the device configuration from the data stream of device configurations.

16. The apparatus of claim 13, wherein the instructions to determine, for each device configuration, which of the cybersecurity vulnerabilities affect the device of the plurality of devices corresponding to the device configuration comprise instructions to filter the cybersecurity vulnerabilities based on a first subset of values that form the device configuration and then determine whether any of the filtered cybersecurity vulnerabilities affect the device based on descriptions of the filtered cybersecurity vulnerabilities and a second subset of the values that form the device configuration.

17. The apparatus of claim 13, wherein the instructions to maintain tracking data for those of the cybersecurity vulnerabilities determined to affect at least one of the plurality of devices comprise instructions to track number of devices affected within a current time period for each cybersecurity vulnerabilities affecting a device in the network.

18. The apparatus of claim 13, wherein the current time period is defined by triggers and wherein a trigger is expiration of a time period, occurrence of a time, or a specified event.

19. The apparatus of claim 13, wherein the machine-readable medium further comprises instructions executable by the processor to cause the apparatus to obtain a listing of the cybersecurity vulnerabilities, wherein the instructions to determine which of the cybersecurity vulnerabilities affect which of the plurality of devices based on the device configurations comprise instructions to evaluate vulnerability descriptions of the cybersecurity vulnerabilities identified in the listing against the device configurations and wherein the listing of the cybersecurity vulnerabilities is updated according to cybersecurity advisories and alerts.

20. The apparatus of claim 13, wherein the cybersecurity vulnerabilities are indicated in an active listing of cybersecurity vulnerabilities updated according to published security advisories and alerts.

* * * * *